US008635878B2

(12) United States Patent
Consoli

(10) Patent No.: US 8,635,878 B2
(45) Date of Patent: Jan. 28, 2014

(54) DUAL USAGE TWO-STAGE INDIRECT EVAPORATIVE COOLING SYSTEM

(71) Applicant: Arthur Samuel Consoli, Scottsdale, AZ (US)

(72) Inventor: Arthur Samuel Consoli, Scottsdale, AZ (US)

(*) Notice: Subject to any disclaimer, the term of this patent is extended or adjusted under 35 U.S.C. 154(b) by 0 days.

(21) Appl. No.: 13/659,646

(22) Filed: Oct. 24, 2012

(65) Prior Publication Data

US 2013/0104581 A1   May 2, 2013

Related U.S. Application Data

(60) Provisional application No. 61/551,570, filed on Oct. 26, 2011.

(51) Int. Cl.
   *F28D 3/00*   (2006.01)
   *F28D 5/00*   (2006.01)

(52) U.S. Cl.
   USPC ............................................. 62/171; 62/304

(58) Field of Classification Search
   USPC ............ 62/171, 304, 309, 310, 314; 454/284
   See application file for complete search history.

(56) References Cited

U.S. PATENT DOCUMENTS

| 1,796,410 | A | * | 3/1931 | Schurtz | 62/142 |
| 4,107,940 | A | * | 8/1978 | Schlom et al. | 62/121 |
| 4,308,222 | A | * | 12/1981 | Goettel et al. | 261/117 |
| 6,385,987 | B2 | * | 5/2002 | Schlom et al. | 62/304 |
| 7,140,195 | B1 | | 11/2006 | Fair | |
| 7,389,652 | B1 | * | 6/2008 | Fair | 62/310 |
| 7,765,827 | B2 | * | 8/2010 | Schlom et al. | 62/309 |

* cited by examiner

*Primary Examiner* — Chen Wen Jiang
(74) *Attorney, Agent, or Firm* — Morgan Law Offices, PLC

(57) ABSTRACT

Chilled water is produced by an evaporative cooling process. The chilled water is then circulated through a liquid-air heat exchanger to produce a primary air supply of cool-dry air wherein no water is introduced into the cool dry air stream. The primary air supply can be used to cool a space, such as an office, where low humidly is desirable. Additionally, the cool, wet air which is a byproduct of the water-cooling phase can be used as a secondary air supply. The secondary air supply can be used to cool a space where higher humidity is tolerated, such as a warehouse, a garage, a barn, etc. The indirect evaporative cooling system can also be used in conjunction with an air conditioning system to reduce operating costs and increase efficiency.

15 Claims, 6 Drawing Sheets

DUAL USAGE TWO-STAGE INDIRECT EVAPORATIVE COOLING SYSTEM

CROSS-REFERENCE TO RELATED APPLICATIONS

This application claims priority of provisional application Ser. No. 61/551,570 to Arthur S. Consoli, entitled "IMPROVED TWO-STAGED INDIRECT EVAPORATIVE COOLING SYSTEMS", filed on Oct. 26, 2011, which is incorporated herein by reference in its entirety.

BACKGROUND OF THE INVENTION

1. Field of the Invention

The present invention relates to the field of evaporative cooling, and, more particularly, to a dual usage two-stage indirect evaporative cooling system.

2. Description of the Related Art

A typical design for an evaporative cooler includes a water reservoir, a pump to circulate water from the water reservoir to evaporative pads, and an electric blower to draw outside air through the pads, cooling the air by evaporation. Such a design goes back at least to U.S. Pat. No. 838,602 to Zellweger, issued in 1906.

Although evaporative cooling systems are not as popular as they once were, they are still in wide usage in the desert Southwest, particularly in older homes and industrial buildings. It is quite common in these parts of the country, for example, for a warehouse or car repair facility to be cooled with an evaporative cooler.

The great virtue of the traditional evaporative cooler is the energy savings, but the biggest problem is that the cooled air tends to have a high humidity level, often 70-80%, which can feel uncomfortable. To remedy this problem, "two-stage" indirect evaporative coolers have been developed which provide cool air at a lower relative humidity. However, conventional two-stage indirect evaporative coolers do not meet the needs of many mixed use facilities where parts of the building (e.g., an office) require the dry air while other parts (e.g., a warehouse) do not.

SUMMARY OF THE INVENTION

One aspect of the disclosure relates to a dual usage cooling system comprising a two-stage indirect evaporative cooler that is capable of supplying a first air supply through a first conduit to a first space and supplying a second air supply through a second conduit to a second space, the first air supply and the second air supply having substantially different moisture levels.

In an embodiment, the dual usage cooling system comprises a wet portion including an evaporative cooler that chills a supply of liquid (e.g., water) and outputs a secondary air supply cooled by the evaporative cooler; and a heat exchanger which uses the chilled liquid to transfer heat from air inputted into the heat exchanger coil wherein the chilled liquid passes through and the input air contacts outer surfaces of the coil. The primary air supply will have a substantially lower moisture level than the secondary air supply and the primary air supply will have substantially the same moisture level as the return air inputted into the heat exchanger.

In an embodiment, the dual usage cooling system includes a reservoir containing a supply of water, a series of drifts, a pump to move water from the reservoir through dispersing heads which produce fine mist, a fan for drawing outside air through the drifts to the dispersing heads, and output the cooler as wetted secondary air. Preferably, the water dispersing heads will be situated at various elevations to optimize water dispersion. The pump also circulates the chilled water from the reservoir through the heat exchanger and brings the then warm water back to the reservoir to be re-cooled. A blower sucks return air through the heat exchanger and outputs the dry, cool air as the primary air supply.

In an embodiment, the heat exchanger includes an anti-siphon loop to keep the coil charged with water between pump cycles.

In an embodiment, for easy maintenance, the dual usage cooling system can include a transparent filter cover allowing a user to visually inspect the water filter without removing the cover.

In an embodiment, the dual usage cooling system can be used to supplement an air conditioning system to reduce operating costs and increase efficiency. In this embodiment, the system can be controlled according to preset values for temperature, relative humidity, and carbon dioxide level. The dual usage cooling system can be activated to supplement the air conditioning system when the space can be effectively cooled by evaporative cooling alone.

DETAILED DESCRIPTION OF THE INVENTION

Figure 1:
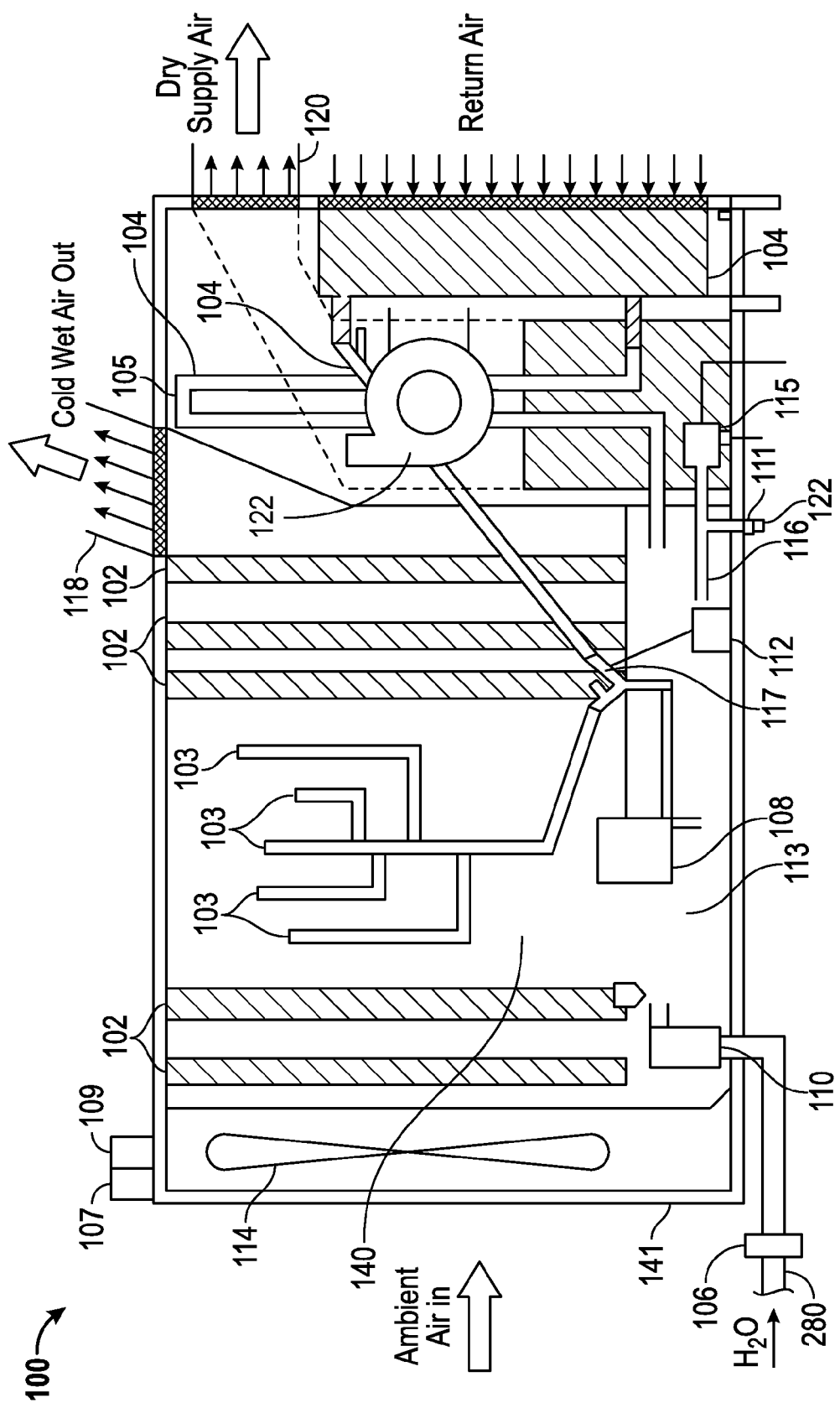
FIG. 1 illustrates a schematic view of a dual usage two-stage indirect evaporative cooler, according to a preferred embodiment of the present invention.

FIG. 1 is a schematic view illustrating a dual usage two-stage indirect evaporative cooler 100, according to an embodiment of the present invention. As will be described in detail, in the first stage, the dual usage two-stage indirect evaporative cooler 100 produces chilled water as a result of an evaporative cooling process, and the "wet cooled" air from this evaporative cooling is used as a secondary air supply to cool a space where higher humidity is tolerated, such as a warehouse or garage. In the second stage, "dry cooled" air is produced and used as a primary air supply for a space where low humidity is desirable, such as an office. In an embodiment, one or more dual usage two-stage indirect evaporative cooler 100 can be used in conjunction with a refrigeration-based air conditioning system to reduce its operating costs and increase efficiency.

In the embodiment shown in FIG. 1, the dual usage two-stage indirect evaporative cooler 100 is adapted to be used as a package unit wherein a waterproof tank 140 (which creates the evaporation and the chilled water) is in an enclosed frame 141 together with a heat exchanger (liquid-air heat exchanger loop 104) and blower 122. However, it is to be understood that in other embodiments, the dual usage two-stage indirect evaporative cooler 100 can be configured such that the heat exchanger (liquid-air heat exchanger loop 104) and blower 122 are enclosed in a separate unit, and the chilled water is piped thereto. Used water would be returned to reservoir 113 through another set of piping.

The dual usage two-stage indirect evaporative cooler 100 comprises drifts 102, water dispersing heads 103, the liquid-air heat exchanger loop 104, an anti-siphon loop 105 (connected to the liquid-air heat exchanger loop 104), a view flow filter 106 (situated on the water line 280), a thermostat 107 (which can be relocated in a convenient location within a building), a controller 109, a pump 108, the reservoir 113, a float valve 110, a reservoir drain 111, a submersible sump pump 112, an ambient air fan 114, the blower 122, a timer 115, a drain line 116, and a check valve 117.

In the present embodiment, when the thermostat 107 calls for cooling of the return air, the controller 109 activates the pump 108, which wets the drifts 102 and pumps water into the water dispersing heads 103, with water from the reservoir 113. The controller 109 also turns on the ambient air fan 114, which draws ambient air which passes through the drifts 102 and the water dispersing heads 103 evaporatively cooling the air and the circulating water which returns to the reservoir 113. The cooled, wet air from the forgoing evaporative cooling process is exhausted via a duct 118 where it can be used as a secondary air supply to cool a space where humidity is tolerated.

The pump 108 circulates the chilled-water from the reservoir 113 through the liquid-air heat exchanger loop 104 (which comprises a metal coil). The blower 122 sucks return air over outer surfaces of the coil. Dry, cool air is produced and is exhausted by the blower 122 as the primary air supply via a duct 120 to spaces where less humidity is desired, such as an office. The check valve 117 and the anti-siphon loop 105 act to keep the liquid-air heat exchanger loop 104 charged with water between pump cycles—such that heat transfer can almost immediately start when the controller 109 activates the pump 108.

The check valve 117 can be a one-way valve that only allows the reservoir water (working fluid) to travel from the reservoir 113 such that the water cannot drain back into the reservoir 113 when the pump 108 is switched off by the controller 109. The benefit of ensuring that the water is maintained in the liquid-air heat exchanger loop 104 is that at the beginning of the subsequent pump cycle, heat transfer can immediately occur, which hastens cooling of the return air form the conditioned space. Preferably, check valve 117 is a spring cock valve and preferably is installed in the supply line of the liquid-air heat exchanger loop 104.

In an embodiment, the controller 109 activates a timer 115 (e.g., General Electric timer No. 15117) which is preset to open and close a submersible sump pump 112 periodically for the purposes of cleaning the reservoir 113.

In an embodiment, the drifts 102 are air intake louvers comprising panels about 2½ inches in thickness which fit vertically into the interior of the waterproof tank 140, along pre-formed slots or brackets on vertical side surfaces thereof.

The width of the drifts 102 is about the same as that of the interior portion of the waterproof tank 140, and the drifts 102 can extend from the top of the waterproof tank 140 to the waterline of the reservoir 113. In an embodiment, the drifts 102 comprise cellular honeycomb panels made of a PVC or ABS plastic material. Representative manufacturers of such air intake louvers useable for the drifts 102 include Evapco, Inc. of Westminster, Md. (e.g., the WST Air Inlet Louver) and IMECO, Inc. (a Johnson Controls Company) of Dixon, Ill. Distributors of such air intake louvers useable for the drifts 102 include Cooling Tower Products of Phoenix, Ariz. (e.g., Part No. CL-100).

The reservoir 113 forms a cavity that holds the water chilled by the action of the ambient air fan 114 pushing ambient air through the drifts 102 and the water dispersing heads 103 where rapid evaporation occurs. Fresh water is supplied to the reservoir from water supply line 280 by operation of the float valve 110. When the water level of the reservoir 113 has fallen below a predetermined level, the float valve 110 opens to allow water in from water supply line 280 until the reservoir 113 is filled. In an embodiment, the reservoir 113 holds about 25 gallons of water and has a sloped bottom (slope not shown). The sloped bottom-surface of the reservoir 113 facilitates gravity drain of the reservoir 113 at scheduled maintenance cycles, when the timer 115 opens the submersible sump pump 112 which is connected to the reservoir 113 at the reservoir drain 111. The controller 109 provides power to the timer 115 which opens and closes the submersible sump pump 112. The frequency and duration that the timer 115 opens the sump pump 112 can be preset by the user.

The enclosed frame 141 can be constructed from extruded aluminum frame components permitting consistent fabrication. In an embodiment, the enclosed frame measures 36 inches in height, 33 inches in width, and 93 inches in length. Upon reading the teachings of this specification, those with ordinary skill in the art will now understand that, under appropriate circumstances, considering such issues as advances in technology, user preference, aesthetic considerations, etc., other materials, such as reinforced plastics, passivated steels, other shapes and dimensions, and other methods of attaching the frame, such as threaded fasteners, welding, etc., may be used.

Figure 2:
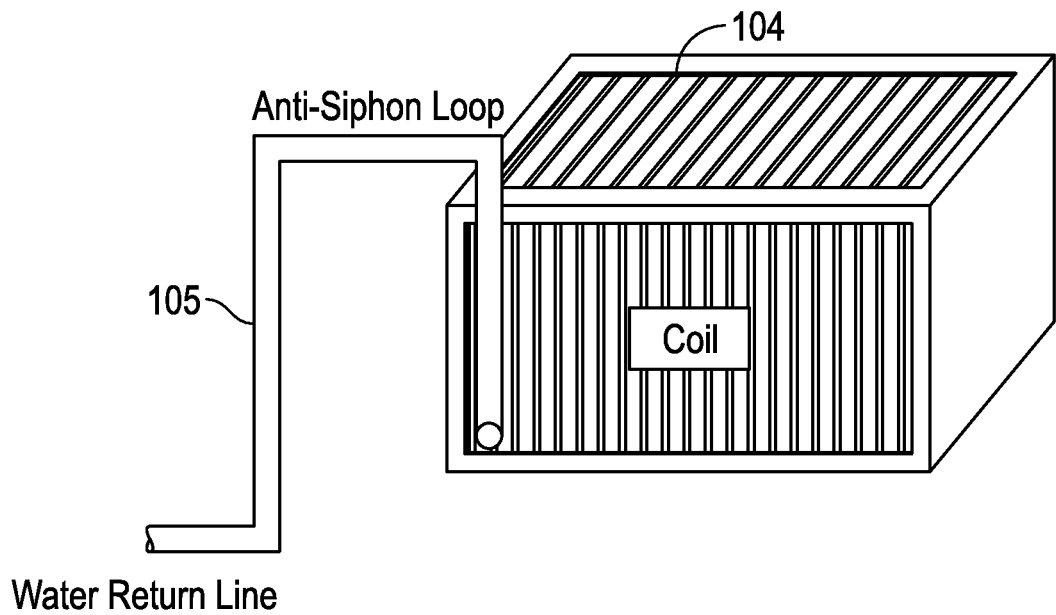
FIG. 2 illustrates an anti-siphon loop as installed in a liquid-air heat exchanger loop of the dual usage two-stage indirect evaporative cooler.

FIG. 2 shows a side view illustrating the anti-siphon loop 105 as installed in the liquid-air heat exchanger loop 104 and having at least one portion situated higher in elevation above the coil. The anti-siphon loop 105 keeps water from the reservoir 113 in the loop 104 after the controller 109 switches off the liquid-air loop pump 115, such that at the beginning of the next pump cycle, heat transfer can almost immediately occur, which hastens cooling of the return air from the conditioned space. Additionally, this feature eliminates a possibility that the returning reservoir water will overfill the reservoir 113, flooding outside structures causing damage thereto.

Figure 3A:
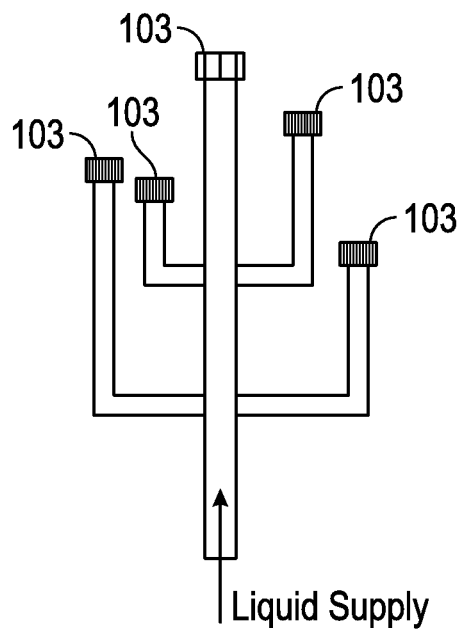
FIG. 3A illustrates a side view of water-dispersing heads as installed in the dual usage two-stage indirect evaporative cooler.
Figure 3B:
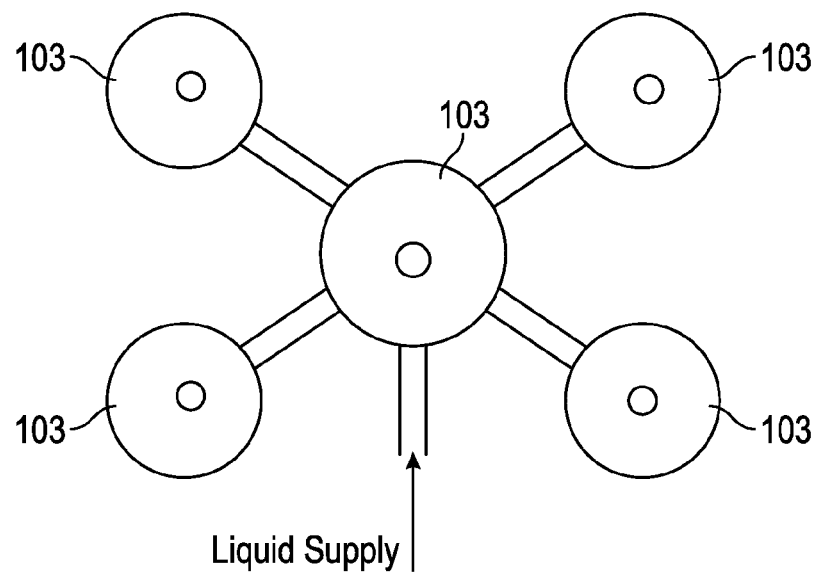
FIG. 3B illustrates a top view of the water-dispersing heads.
Figure 3C:
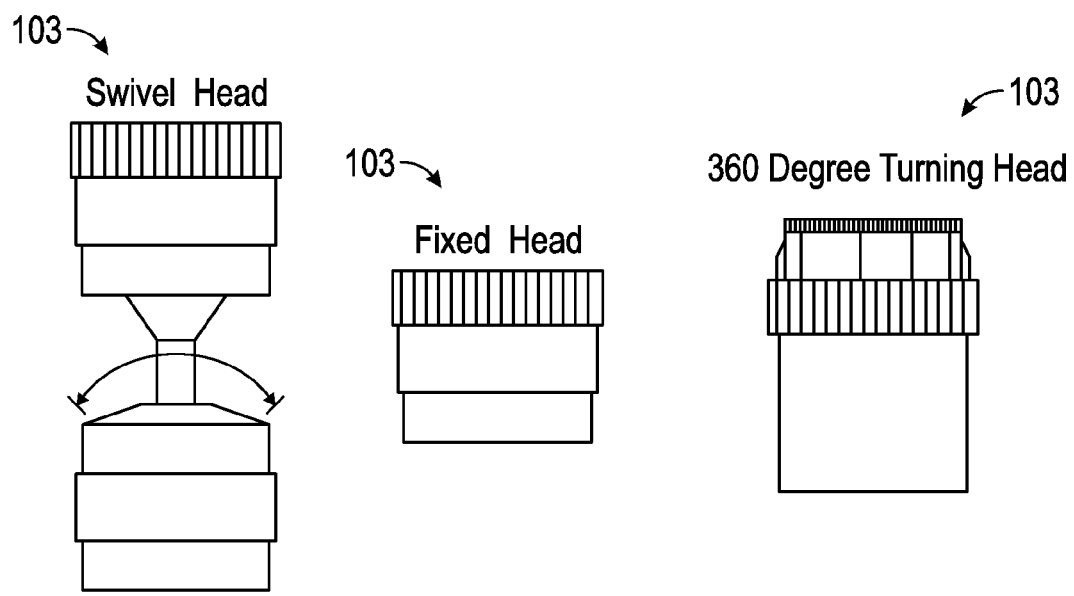
FIG. 3C illustrates various types of water-dispersing heads useable in conjunction with the present invention.

FIG. 3A shows a side view illustrating the water dispersing heads 103. As shown, the water dispersing heads 103 are situated higher in elevation above the heat exchanger loop 104. FIG. 3B shows a top view of the water dispersing heads 103. FIG. 3C shows various types of water dispersing heads available for usage with the present invention such as are commonly used for water misting applications.

In a preferred implementation, the water dispersing heads 103 are connected to the pump 108 by ¾-inch feed pipes, and provide a misting of water droplets that evaporate when hit by the fast-moving, incoming, ambient air pulled by the ambient air fan 114. A representative ambient air fan 114 useable in conjunction with the present invention is the Model No. A O Smith AKA26. The heat-of-evaporation is extracted from a combination of the air and reservoir water—reducing the temperature of both fluids.

In the preferred implementation, the water dispersing heads 103 are fed with a 1-inch supply and are an arrangement of 12-heads with ¼-inch orifices open 50% to 360 degree spray, wherein:

2 are 20" from the reservoir floor;
4 are 24" from the reservoir floor;
2 are 26" from the reservoir floor; and
4 are 28" from the reservoir floor.

Preferably, all 12 heads have ⅛" openings in the sides half way up the length of the feed pipes to permit more fine streams of water to atomize with the mixed air coming off the drifts 102.

Figure 4:
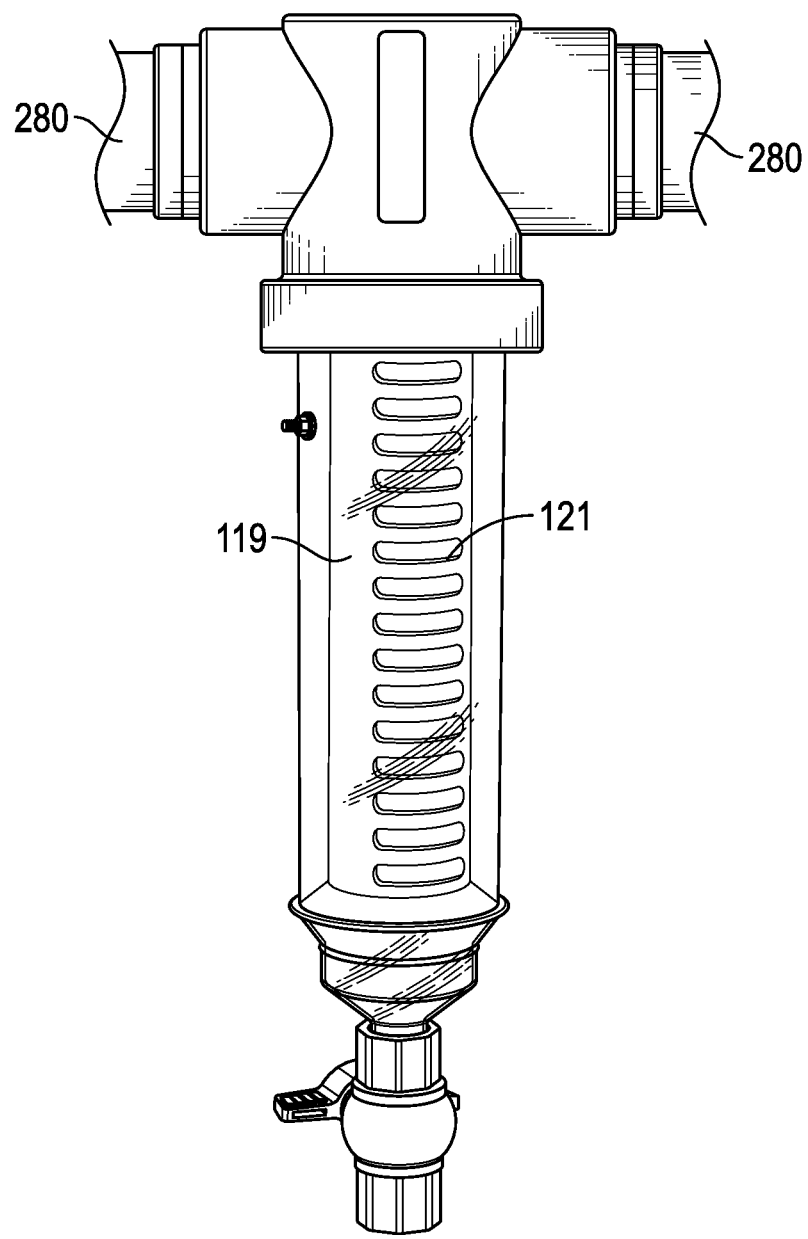
FIG. 4 illustrates a perspective view of a view-flow filter as installed in the dual usage two-stage indirect evaporative cooler.

FIG. 4 illustrates a front view illustrating a view-flow filter 106 as installed outside the dual usage two-stage indirect evaporative cooler of FIG. 1. Preferably the view-flow filter 106 has a transparent cover 119 (e.g., made of glass) so as to facilitate determining whether the filter needs to be changed by visual inspection. Preferably, the view-flow filter 106 includes a filter 121 capable of trapping foreign materials and chemicals from water supply line 280.

Figure 5:
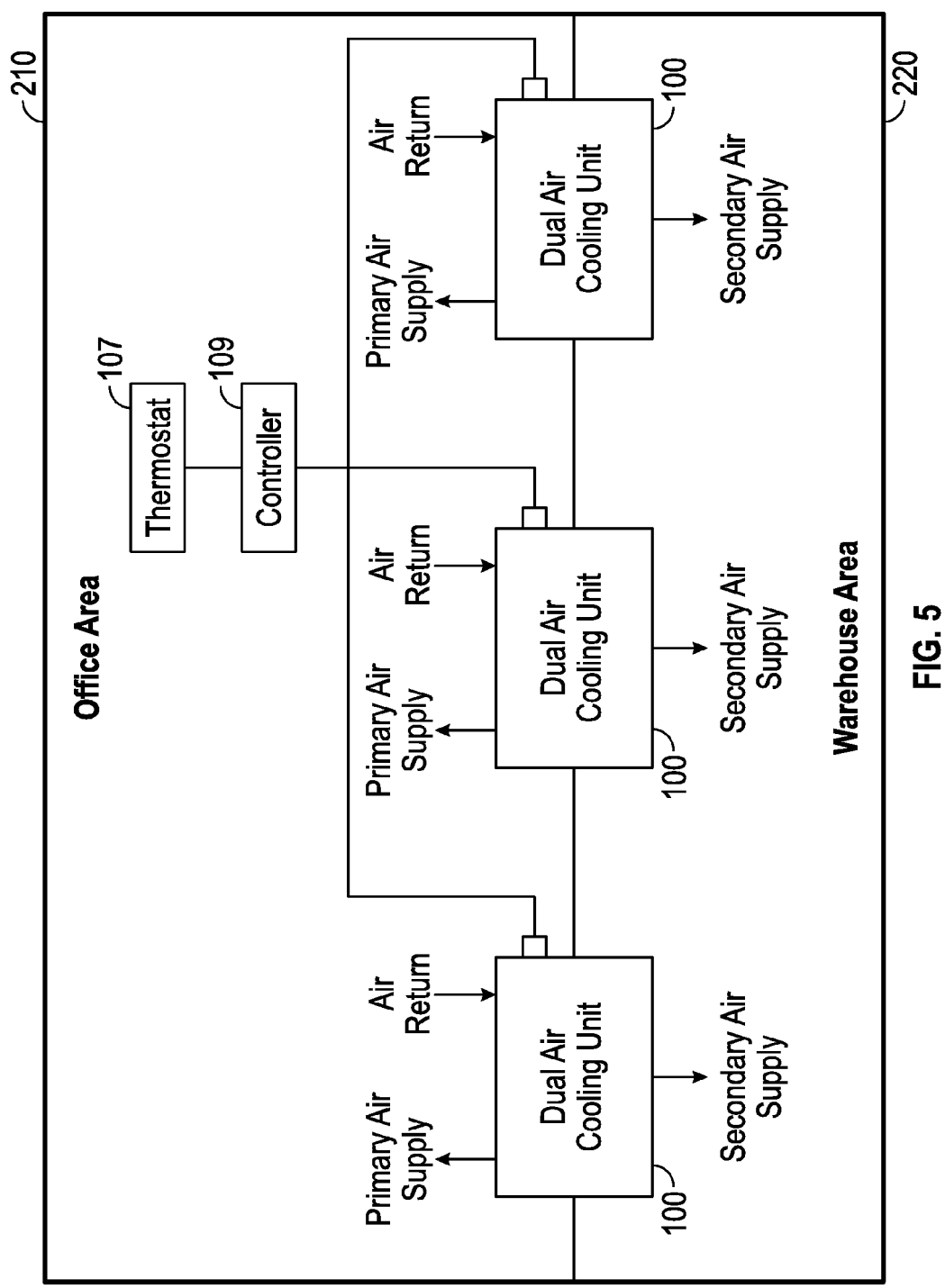
FIG. 5. illustrates a schematic view of an exemplary application using dual-usage two-stage indirect evaporative coolers to cool two building areas using primary and secondary air supplies, according to a preferred embodiment of the present invention.

FIG. 5. illustrates a schematic view of an exemplary application using multiple dual-usage two-stage indirect evaporative coolers 100 to cool two building areas (an office 210 and an adjoining warehouse 220) using primary and secondary air supplies, according to a preferred embodiment of the present invention. In this example, the primary air supply from each of the dual usage two-stage indirect evaporative coolers 100 is ducted into the office 210 with returns from the office 210 back to each unit. The secondary air from each of the dual usage two-stage indirect evaporative coolers 100 is ducted into the warehouse 220; there is no return air from the warehouse 220. As an option all or a portion of the secondary air could be ducted outside the building and dispersed under a canopy to provide additional working or storage space thereby increasing the utilization of the facility. The thermostat 107 would be installed in the office and would be set to the comfort level desired by those working in the office 210. The controller 109 (which could be located on the cooler) would be linked to the thermostat 107 which would be conveniently located in the building.

Figure 6:
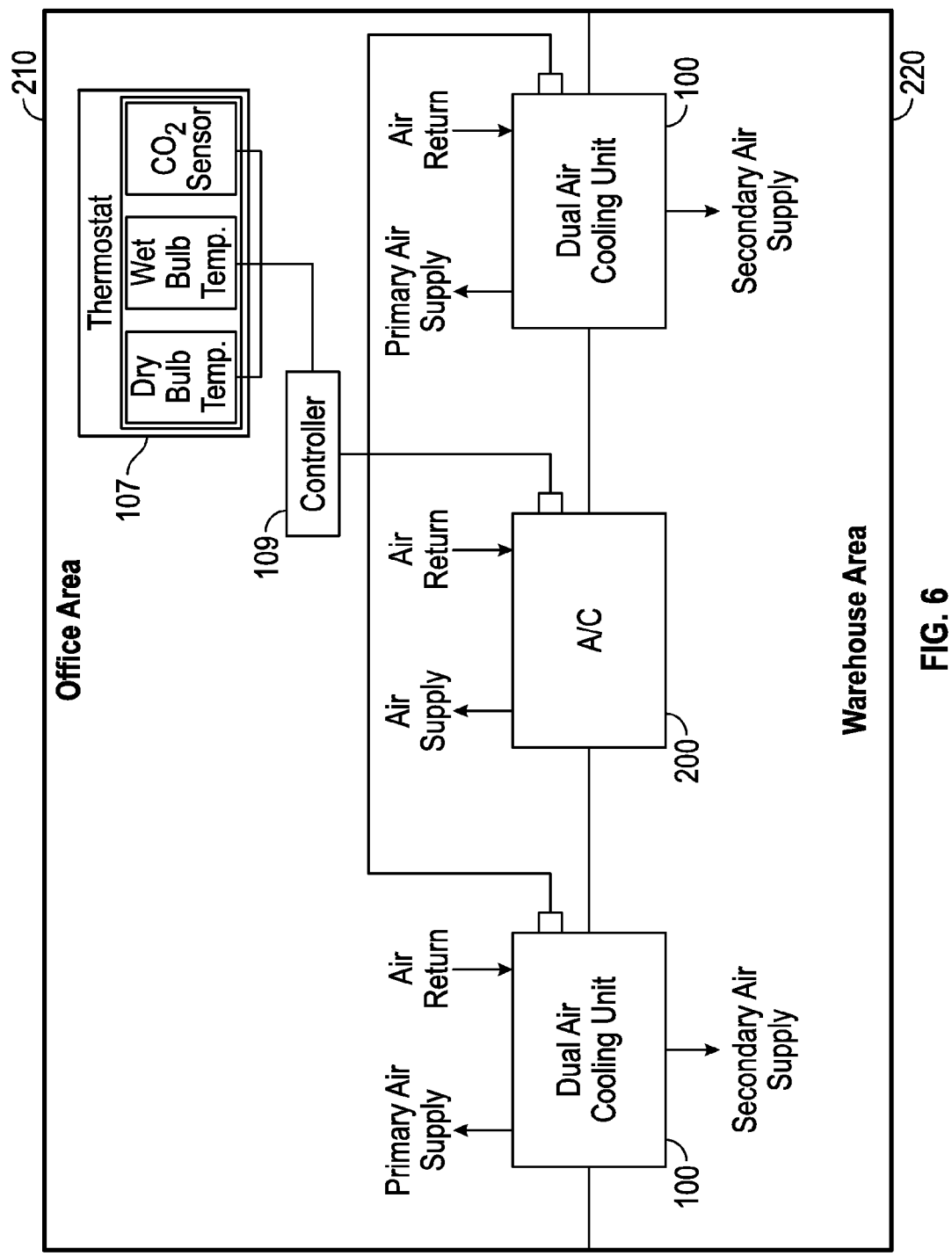
FIG. 6 illustrates a schematic view of an exemplary application using dual-usage two stage evaporative coolers to cool two building areas using primary and secondary air supplies in conjunction with a separate air conditioning system cooling one of the building areas, according to a preferred embodiment of the present invention.

FIG. 6 illustrates a schematic view of an exemplary application using multiple dual-usage two stage evaporative coolers 100 to cool two building areas (the office 210 and the adjoining warehouse 220) using primary and secondary air supplies in conjunction with a separate air conditioning system 250 to cool one of the building areas (the office 210), according to a preferred embodiment of the present invention. In this example, two dual-usage two stage evaporative coolers 100 are installed on the roof at the dividing line where the office 210 and the warehouse 220 meet, and one air conditioning system 250 is installed on the roof on that same line midway between the two dual-usage two stage evaporative coolers 100. The primary air supply from the two dual-usage two stage evaporative coolers 100 is ducted into the office 210 with returns from the office 210 back to the dual-usage two stage evaporative coolers 100. The air supply of the air conditioning system 250 is ducted into the office 210 with a return duct back to the air conditioning system 250. The secondary air from the dual-usage two stage evaporative coolers 100 is ducted into the warehouse 220; there is no return air.

The thermostat 107 provides the user with the ability to designate the temperature at which the dual-usage two stage evaporative coolers 100 turn on (e.g., 78 degrees F.) This is referred to as the "Phase One" setting. When the temperature falls below 78 degrees the system would shut off. Further, the thermostat 107 provides the user with the ability to set the temperature at which the air conditioning system 250 would turn on; say 82 degrees F. This would be the "Phase Two" setting. If the temperature reaches 82 degrees the air conditioning system 250 would turn on. When the temperature falls below 82 degrees the air conditioning system 250 would turn off. It is to be understood that the forgoing example is a provided for illustrative purposes, and the temperature at which the thermostat switches off could be different from the temperature at which it switches on again, the difference between these temperatures known as the hysteresis which would be a predetermined or preset value. Finally, the thermostat 107 allows the user to set the relative humidity percentage, say 30% relative at which point the air conditioning system 250 would turn on.

Because the primary air supply from the dual-usage two stage evaporative coolers 100 is continually recirculated, it is possible that people in the office 210 will feel uncomfortable as the level of $CO_2$ rises. Outdoor air typically contains 300 to 500 ppm $CO_2$. Most people will feel comfortable entering a space where the $CO_2$ level is 700 ppm above the outdoor level. To remedy this problem, the thermostat 107 also allows the user to set the $CO_2$ level (e.g., 1200 ppm) at which point the air conditioning system 250 would turn on.

Activating the air conditioning system 250 based on humidity and/or the $CO_2$ level takes advantage of the ability of the air conditioning system 250 to remove moisture from the air and mix a preset percentage of ambient air with the recirculating air it cools. Further, the user can achieve maximum control with regard to comfort and safety while at the same time minimizing electricity expense.

While this invention has been described in conjunction with the various exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A dual usage cooling system, comprising:
a wet portion comprising an evaporative cooler that chills a supply of liquid and outputs a secondary air supply cooled by the evaporative cooler to a first room; and
a heat exchanger which uses the chilled liquid to transfer heat from air inputted into the heat exchanger thereby cooling the air, the cooled air output as a primary air supply to a second room;
wherein the first room and the second room are situated in different parts of the same building;
wherein the primary air supply has a substantially lower moisture level than the secondary air supply;
wherein the heat exchanger includes a coil wherein the chilled liquid passes through and the inputted air contacts outer surfaces thereof; and
wherein the wet portion further comprises a housing, a plurality of drifts and a water disperser having at least three water dispersing heads capable of producing mist; wherein each of the drifts extend from the ceiling of the housing to just above the water level of a reservoir rising from the floor of the housing, and the water disperser is disposed between a pair of the drifts and the at least three water dispersing heads are situated at different heights to each other relative to the floor.

2. The dual usage cooling system of claim 1, wherein the liquid is water.

3. The dual usage cooling system of claim 1, wherein the primary air supply has substantially the same moisture level as the air inputted into the heat exchanger.

4. The dual usage cooling system of claim 1, further comprising an opening for returning air to the heat exchanger.

5. The dual usage cooling system of claim 1, further comprising a pump which circulates the liquid.

6. The dual usage cooling system of claim 1, wherein the coil includes an anti-siphon loop that keeps the liquid in the coil while the cooling system is not running.

7. The dual usage cooling system of claim 1, wherein an outside water line includes a view filter allowing a user to visually inspect the filter.

8. The dual usage cooling system of claim 1, wherein an air conditioning system is installed for the first room.

9. The dual usage cooling system of claim 8, wherein the cooling system is controlled according to preset values for one or more of dry temperature and relative humidity.

10. The dual usage cooling system of claim 9 wherein the air conditioning system is further controlled by activating the air conditioning system according to a preset value for carbon dioxide.

11. A system for cooling at least a portion of a building, the building including at least a first room and a second room; comprising:
 a two-stage indirect evaporative cooler comprising (a) a direct evaporative cooler that chills a supply of liquid and produces a secondary air supply cooled by the evaporative cooler, and (b) a heat exchanger comprising a coil wherein the chilled liquid passes through and air inputted into the heat exchanger contacts outer surfaces thereof thereby cooling the air, the cooled air used as a primary air supply;
 wherein the primary air supply has a substantially lower moisture level than the secondary air supply;
 a first duct attached to a first port of the two-stage indirect evaporative cooler and extending to a first opening to the first room, the first duct carrying air of the primary air supply to the first room;
 a second duct attached to a second port of the two-stage indirect evaporative cooler and extending to a second opening in the second room, the second duct carrying air of the secondary air supply to the second room;
 an air conditioning system having an air supply connected to the first room; and
 an a controller that turns the air conditioning system on based on preset values for temperature and carbon dioxide level;
 wherein the direct evaporative cooler further comprises a housing, a plurality of drifts and a water disperser having at least three water dispersing heads capable of producing mist; wherein each of the drifts extends from the ceiling of the housing to just above the water level of a reservoir rising from the floor of the housing, and the water disperser is disposed between a pair of the drifts and the at least three water dispersing heads are situated at substantially different heights to each other relative to the floor.

12. A system, comprising:
 the cooling system of claim 11, wherein
 an air conditioning system having an air supply is connected to the first room; and
 the cooling system is activated to supplement the air conditioning system only when one or more predetermined threshold value is reached.

13. The system of claim 12, wherein the air conditioning system is activated based on preset values for one or more of dry temperature, relative humidity level, and carbon dioxide level.

14. The system of claim 12, wherein the air conditioning system is activated based on a preset value for carbon dioxide level.

15. The system of claim 11, wherein the two-stage indirect evaporative cooler is situated on a roof of the building.

* * * * *